United States Patent
Kimura et al.

(10) Patent No.: US 8,812,201 B2
(45) Date of Patent: Aug. 19, 2014

(54) HYDRAULIC CONTROL SYSTEM FOR AUTOMATIC TRANSMISSION

(75) Inventors: Kenta Kimura, Toyota (JP); Yuji Hattori, Toyota (JP); Tomokazu Inagawa, Toyota (JP); Takafumi Inagaki, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/823,210

(22) PCT Filed: Dec. 20, 2010

(86) PCT No.: PCT/JP2010/072898
§ 371 (c)(1),
(2), (4) Date: Apr. 5, 2013

(87) PCT Pub. No.: WO2012/085999
PCT Pub. Date: Jun. 28, 2012

(65) Prior Publication Data
US 2013/0289840 A1    Oct. 31, 2013

(51) Int. Cl.
*B60W 10/02*    (2006.01)
*B60W 10/107*    (2012.01)
*F15B 21/08*    (2006.01)
*F15B 21/04*    (2006.01)
*F16H 61/00*    (2006.01)
*F16H 61/66*    (2006.01)
*F16H 9/18*    (2006.01)

(52) U.S. Cl.
CPC ............ *B60W 10/023* (2013.01); *B60W 10/107* (2013.01); *F15B 21/087* (2013.01); *F15B 21/04* (2013.01); *F16H 61/00* (2013.01); *F15B 21/044* (2013.01); *F16H 2061/004* (2013.01); *F16H 61/66* (2013.01); *F16H 9/18* (2013.01)

USPC ................... 701/51; 477/37; 477/38; 477/39; 477/40; 477/44; 475/116; 60/329; 137/171; 137/197

(58) Field of Classification Search
CPC . B60W 10/10; B60W 10/023; B60W 10/101; B60W 10/103; B60W 10/107; F16H 9/00; F16H 9/02; F16H 9/04; F16H 9/08
USPC .......... 701/51, 58, 65, 66; 477/37, 38, 39, 40, 477/42, 44, 45, 46; 475/116, 210; 60/329; 137/171, 197
See application file for complete search history.

(56) References Cited

U.S. PATENT DOCUMENTS

RE33,043 E  *  9/1989  McBeth .......................... 60/327
5,928,108 A      7/1999  Takiguchi
(Continued)

FOREIGN PATENT DOCUMENTS

EP    0 985 855 B1    12/2005
JP    A-8-166058      6/1996
JP    A-10-169764     6/1998
(Continued)

*Primary Examiner* — Thomas G Black
*Assistant Examiner* — Peter D Nolan
(74) *Attorney, Agent, or Firm* — Oliff PLC

(57) ABSTRACT

A hydraulic control system for an automatic transmission. The hydraulic control system is applied to an automatic transmission adapted to vary a torque capacity of a transmission member by an actuator. The hydraulic control system includes: a discharging device configured to discharge compressible gas entrained in the hydraulic fluid in the actuator; an interrupting device that interrupts power transmission; and a controller configured to determine an entrainment of the compressible gas in the hydraulic fluid, disconnect the power transmission via the interrupting device in a case that an entrained compressible gas is determined, and cause the entrained compressible gas to be removed from the hydraulic fluid by rotating the actuator while interrupting the power transmission.

15 Claims, 9 Drawing Sheets

(56) References Cited

U.S. PATENT DOCUMENTS

| | | | |
|---|---|---|---|
| 6,332,855 B1 | 12/2001 | Murasugi | |
| 6,579,207 B2 * | 6/2003 | Horiguchi | 477/98 |
| 6,814,689 B2 * | 11/2004 | Horiguchi | 477/161 |
| 7,585,242 B2 * | 9/2009 | Endo | 475/117 |
| 2004/0214669 A1 | 10/2004 | Katou et al. | |
| 2007/0135252 A1 * | 6/2007 | Wright et al. | 475/116 |
| 2010/0057309 A1 | 3/2010 | Ota et al. | |

FOREIGN PATENT DOCUMENTS

| | | |
|---|---|---|
| JP | A-2000-314470 | 11/2000 |
| JP | A-2004-324751 | 11/2004 |
| JP | A-2010-60050 | 3/2010 |
| JP | A-2012-31955 | 2/2012 |

* cited by examiner

HYDRAULIC CONTROL SYSTEM FOR AUTOMATIC TRANSMISSION

TECHNICAL FIELD

This invention relates to a hydraulic control system for an automatic transmission that changes a speed ratio and a transmission torque capacity according to an oil pressure applied thereto.

BACKGROUND ART

In the conventional art, a speed ratio of an automatic transmission is varied hydraulically. For example, in a geared automatic transmission, a clutch is used to transmit a torque to a gear train to achieve a desired speed ratio. The clutch is provided with a hydraulic chamber to establish a pressure to engage the clutch, and a clutch piston thereof is actuated by delivering or draining hydraulic fluid to/from the hydraulic chamber to vary the hydraulic pressure therein. Meanwhile, a continuously variable automatic transmission comprises an input rotary member, an output rotary member, and a power transmission member applied to those rotary members. Both of the rotary members or any one of the rotary members is/are provided with a hydraulic chamber to establish a clamping pressure or to vary the speed ratio. Specifically, the clamping pressure for clamping the power transmission member and the speed ratio of the continuously variable transmission are varied by delivering or draining hydraulic fluid to/from the hydraulic chamber.

An example of the continuously variable transmission is disclosed in the European Patent No. EP0985855. Specifically, European Patent No. EP0985855 relates to a belt-driven continuously variable transmission comprising a pulley functioning as an input rotary member, another pulley functioning as an output rotary member, and a belt functioning as the power transmission member. Each pulley comprises a movable sheave and a fixed sheave, and each movable sheave is provided with a hydraulic chamber. According to the teachings of European Patent No. EP0985855, the speed ratio is varied by varying a running radius of the belt, that is, by moving the movable sheave by varying an amount of oil in the hydraulic chamber. Meanwhile, a belt clamping pressure of the pulley is varied by changing the hydraulic pressure applied to the hydraulic chamber. In addition, in the transmission taught by European Patent No. EP0985855, each hydraulic chamber is provided with a pressure boosting means and a pressure reduction means.

According to the transmission taught by European Patent No. EP0985855, a hydraulic system from a hydraulic source to the hydraulic chamber including valves arranged therein is structurally sealed to prevent a leakage of the hydraulic fluid. In case of raising the pressure in the hydraulic chamber, the oil is delivered to the hydraulic chamber from the pressure boosting means according to a target pressure. In addition, the pressure in the hydraulic chamber can be maintained at a constant pressure without actuating the pressure boosting means. However, if air becomes entrained with the oil in the hydraulic system in which the valves and oil passages are thus sealed, the air is also compressed when pressurizing the oil. In this situation, therefore, it is difficult to achieve a desired pressure. Moreover, a response of the automatic transmission may be slowed to degrade controllability.

DISCLOSURE OF THE INVENTION

The present invention has been conceived noting the technical problems thus far described, and its object is to provide a hydraulic control system for an automatic transmission which can improve a response and a controllability of the automatic transmission, without increasing actuation frequency of the automatic transmission.

In order to achieve the above-mentioned object, according to the present invention, there is provided a hydraulic control system for an automatic transmission. Specifically, the hydraulic control system of the present invention is applied to an automatic transmission, that varies a torque inputted thereto according to a speed ratio and outputs the varied torque from an output member to a driving wheel, and that varies a transmission torque capacity by delivering or draining hydraulic fluid to/from an actuator of a transmission member. The hydraulic control system is provided with a discharging device that discharges compressible gas entrained in the hydraulic fluid in the actuator. The hydraulic control system of the present invention thus structured is characterized by: another member interposed between the output member and the driving wheel to be rotated by a torque transmitted from the output member; an interrupting device that disconnects the output member from another member; an entrainment determining means that determines an entrainment of the compressible gas in the hydraulic fluid; a disconnecting means that disconnects the output member from said another member by the interrupting device in case the entrainment determining means determines that the compressible gas is entrained in the hydraulic fluid; and a discharging means that removes the entrained compressible gas from the hydraulic fluid and discharges the removed compressible gas through the discharging device, by rotating the actuator together with the transmission member under the condition that disconnecting means disconnects the output member from said another member.

The hydraulic control system of the present invention further comprises: an accumulator that accumulates the hydraulic fluid to be delivered to the actuator; and a delivery inhibiting means that inhibits delivery of the hydraulic fluid from the accumulator to the actuator when deliver the hydraulic fluid to the actuator to compensate for the compressible gas removed from the hydraulic fluid by the discharging means.

The entrainment determining means comprises a calculation means that calculates rigidity of the hydraulic fluid, and a determining means that determines necessity to remove the entrained compressible gas from the hydraulic fluid in case the rigidity of the hydraulic fluid is lowered.

In addition, the entrainment determining means includes a means that determines a necessity to remove the entrained compressible gas from the hydraulic fluid based on a fact that the compressible gas is entrained in the hydraulic fluid or a fact that a possibility of entrainment of the compressible gas in the hydraulic fluid is high.

The hydraulic control system of the present invention further comprises an hydraulic pump adapted to establish a hydraulic pressure. The entrainment determining means includes a means that determines a necessity to remove the entrained compressible gas from the hydraulic fluid based on a duration of a stop event of the hydraulic pump.

The discharging means includes a means that carries out a speed change operation of the automatic transmission under the condition that the disconnecting means disconnects the output member from said another member.

The above-mentioned means that carries out a speed change operation of the automatic transmission includes a means that carries out a speed change operation of the automatic transmission repeatedly.

The discharging means further includes a means that varies hydraulic pressure in the actuator under the condition that disconnecting means disconnects the output member from said another member.

The above-mentioned means that varies hydraulic pressure in the actuator includes a means that varies the hydraulic pressure in the actuator repeatedly.

The hydraulic control system of the present invention further comprises an oil passage for discharging at least the hydraulic fluid from the actuator. In addition, the discharging means includes a means that discharges the entrained compressible gas removed from the hydraulic fluid through the discharging device situated above the oil passage.

The calculation means includes a means that determines the rigidity of the hydraulic fluid based on an amount of the hydraulic fluid delivered to the actuator or drained from the actuator; and an amount of change of hydraulic pressure in the actuator resulting from delivering the hydraulic fluid to the actuator or draining the hydraulic fluid from the actuator.

Specifically, the automatic transmission to which the present invention is applied to is a belt-driven continuously variable transmission comprising: a primary pulley to which torque is inputted; a secondary pulley which outputs the torque transmitted from the primary pulley; and a belt applied to the primary pulley and the secondary pulley to transmit the torque therebetween.

The above-mentioned actuator is a hydraulic actuator attached to at least one of the primary pulley and the secondary pulley.

The interrupting device includes a clutch adapted to be engaged to allow a torque reversing mechanism to output a torque in a same direction as that of the torque inputted thereto, and a brake adapted to be engaged to allow the torque reversing mechanism to output a torque in a direction opposite to that of the torque inputted thereto. The disconnecting means includes a means that disconnects the output member from said another member by disengaging the clutch and the brake.

The hydraulic control system of the present invention further comprises a fluid transmission connected to an input side of the automatic transmission.

Thus, a transmission torque capacity of the automatic transmission to which the hydraulic control system of the present invention is applied is varied by delivering or draining oil to/from the actuator of the transmission member, and the hydraulic control system is provided with the discharging device for discharging entrained compressible gas removed from the hydraulic fluid in the actuator. Therefore, a response and a control accuracy of the hydraulic system will not be deteriorated by the entrained gas in the hydraulic fluid. Moreover, the hydraulic control system is provided with another member interposed between the output member and the driving wheel to be rotated by a torque transmitted from the output member, and the interrupting device that disconnects the output member from said another member. Therefore, the automatic transmission can be driven without rotating said another member. Further, the hydraulic control system comprises the entrainment determining means configured to determine the entrainment of the compressible gas in the hydraulic fluid, the disconnecting means configured to disconnect the output member from said another member by the interrupting device in case the entrainment determining means determines that the compressible gas is entrained in the hydraulic fluid, and the discharging means configured to remove the entrained compressible gas from the hydraulic fluid and to discharge the removed compressible gas through the discharging device, by rotating the actuator together with the transmission member under the condition that the disconnecting means disconnects the output member from said another member. Therefore, the compressible gas and the hydraulic fluid having different specific gravities can be separated centrifugally in the actuator without rotating said another member. The compressible gas thus separated by the discharging means can be discharged from the discharging device.

As described, the hydraulic control system of the present invention further comprises the delivery inhibiting means configured to inhibit a delivery of the hydraulic fluid from the accumulator to the actuator when delivering the hydraulic fluid to the actuator to compensate for the compressible gas removed from the hydraulic fluid by the discharging means. Therefore, the highly pressurized hydraulic fluid accumulated in the accumulator will not be used to compensate for the pressure in the accumulator lowered as a result of removing the entrained compressible gas by the discharging means.

According to the present invention, the rigidity of the hydraulic fluid is calculated by the calculation means to determine necessity to remove the entrained compressible gas from the hydraulic fluid when the rigidity of the hydraulic fluid is lowered. Therefore, an entrainment of the compressible gas in the hydraulic fluid can be determined without detecting the entrained compressible gas in the hydraulic fluid directly.

According to the present invention, the necessity to remove the entrained compressible gas is determined based on a fact that the compressible gas is entrained in the hydraulic fluid or a fact that a possibility of entrainment of the compressible gas in the hydraulic fluid is high. Therefore, a pressure drop resulting from an entrainment of the compressible gas in the oil can be detected in advance.

The hydraulic control system of the present invention is provided with the hydraulic pump for establishing a hydraulic pressure, and the compressible gas may be entrained in the oil while stopping the hydraulic pump. However, the entrainment determining means is configured to determine a necessity to remove the entrained compressible gas from the hydraulic fluid based on a stopping duration of the hydraulic pump. Therefore, an entrainment of the compressible gas in the hydraulic fluid can be estimated even under the situation where the entrainment of the compressible gas cannot be detected directly. For this reason, a hydraulic response and a control accuracy of the hydraulic system will not be deteriorated.

According to the present invention, the entrained compressible gas can be removed effectively from the hydraulic fluid by carrying out a speed change operation of the automatic transmission to vary a volume of the actuator, while disconnecting the output member from said another member by the disconnecting means.

Even if a large amount of compressible gas is entrained in the hydraulic fluid, according to the present invention, the entrained compressible gas can be removed from the hydraulic fluid more certainly by carrying out the speed change operation of the automatic transmission repeatedly.

Alternatively, the entrained compressible gas can also be removed from the hydraulic fluid by increasing and decreasing the hydraulic fluid in the actuator to vary the hydraulic pressure therein, while disconnecting the output member from said another member by the disconnecting means.

In this case, even if a large amount of compressible gas is entrained in the hydraulic fluid, the entrained compressible gas can be removed from the hydraulic fluid more certainly by varying the hydraulic pressure in the actuator repeatedly.

As also described, the hydraulic control system of the present invention is provided with the oil passage for discharging the hydraulic fluid from the actuator, and the discharging device is situated above the oil passage. The entrained compressible gas discharged from the actuator is situated in an upper region in the oil passage by a difference of the specific gravity or density between the compressible gas and the hydraulic fluid. Therefore, the entrained compressible gas can be discharged effectively.

The present invention determines a rigidity of the hydraulic fluid based on: an amount of the hydraulic fluid delivered to the actuator or drained from the actuator; and an amount of change of hydraulic pressure in the actuator as a result of delivering the hydraulic fluid to the actuator or draining the hydraulic fluid from the actuator. Therefore, an entrainment of the compressible gas in the hydraulic fluid can be detected based on an amount of change in the actual hydraulic pressure.

As also described, according to the present invention, the belt-driven continuously variable transmission is employed as the automatic transmission. Therefore, a slippage of the belt, and a control delay in the speed change operation can be prevented by improving an accuracy and a response of the hydraulic control of the actuator attached to the pulley of the belt-driven continuously variable transmission.

According to the present invention, the clutch and the brake of the torque reversing mechanism serve as the interrupting device, and the disconnecting means is configured to disconnect the output member from another member by disengaging the clutch and the brake of the torque reversing mechanism. Therefore, the response of the hydraulic control can be improved without changing a conventional arrangement.

The hydraulic control system of the present invention is further provided with the fluid transmission connected to the input side of the automatic transmission. Therefore, the power inputted to the fluid transmission is transmitted to the automatic transmission while being amplified. That is, the automatic transmission can be driven without amplifying the power inputted to the fluid transmission under the situation where the output member of the automatic transmission is disconnected from another member by the interrupting device.

BEST MODE FOR CARRYING OUT THE INVENTION

Figure 2:
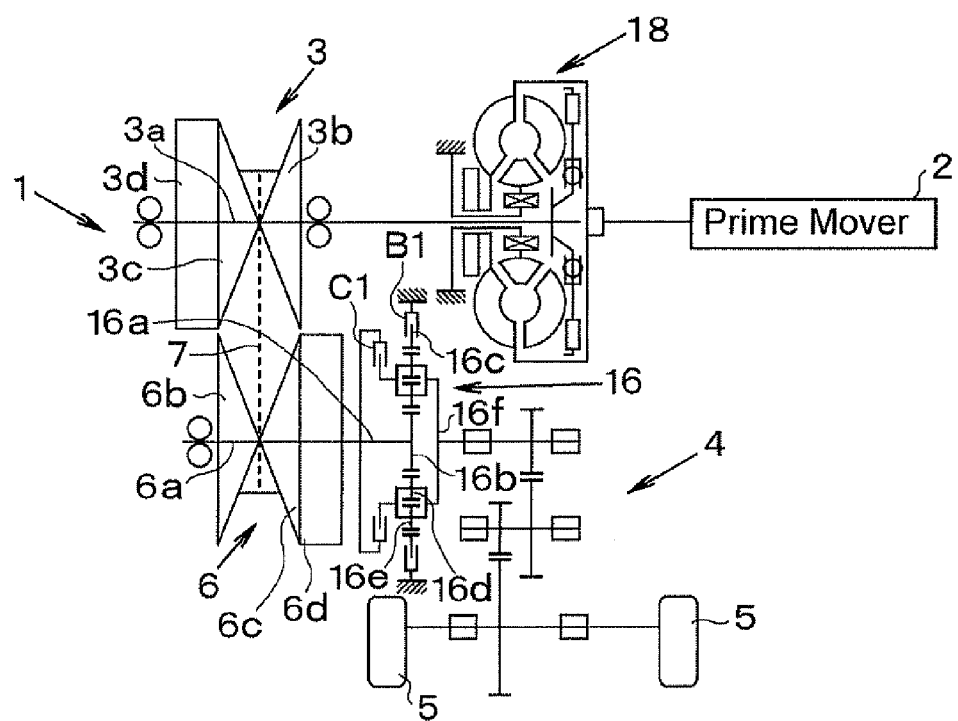
FIG. 2 is a skeleton diagram showing an example of power train having the automatic transmission to which the present invention is applied.

First of all, here will be briefly explained a structure of a conventional belt-driven continuously variable transmission to which the present invention is applied. FIG. 2 is a skeleton diagram showing a power train using the belt-driven continuously variable transmission. The belt-driven continuously variable transmission 1 to be explained in this example is used in an automobile. For this purpose, the belt driven continuously variable transmission 1 comprises: a primary pulley 3 to which a torque is transmitted from a prime mover 2; a secondary pulley 6 which transmits the torque from the primary pulley 3 to a wheel 5 through a gear train 4; and a belt 7 applied to the pulleys 3 and 6 to transmit a power therebetween.

Specifically, the primary pulley 3 comprises a fixed sheave 3b integrated with a rotary shaft 3a, and a movable sheave 3c being opposed to the fixed sheave 3b while being allowed to move along a rotational axis. Likewise, the secondary pulley 6 also comprises a fixed sheave 6b integrated with a rotary shaft 6a, and a movable sheave 6c being opposed to the fixed sheave 6b while being allowed to move along a rotational axis. In addition, a hydraulic chamber 3d is formed on a back face of the movable sheave 3c, and a hydraulic chamber 6d is formed on a back face of the movable sheave 6c. Therefore, a load applied to the movable sheave 3c or 6c in the axial direction is changed by delivering or draining oil to/from the hydraulic chamber 3d or 6d. Specifically, in order to vary a speed ratio of the continuously variable transmission 1, a running radius of the belt 7 in the primary pulley 3 is changed by delivering or draining the oil to/from the hydraulic chamber 3c thereby moving the movable sheave 3c along the rotational axis of the primary pulley 3. Likewise, in order to vary a torque capacity of the continuously variable transmission 1, a clamping pressure for clamping the belt 7 by the secondary pulley 6 is changed by delivering or draining the oil to/from the hydraulic chamber 6c to change the oil pressure applied thereto.

Figure 3:
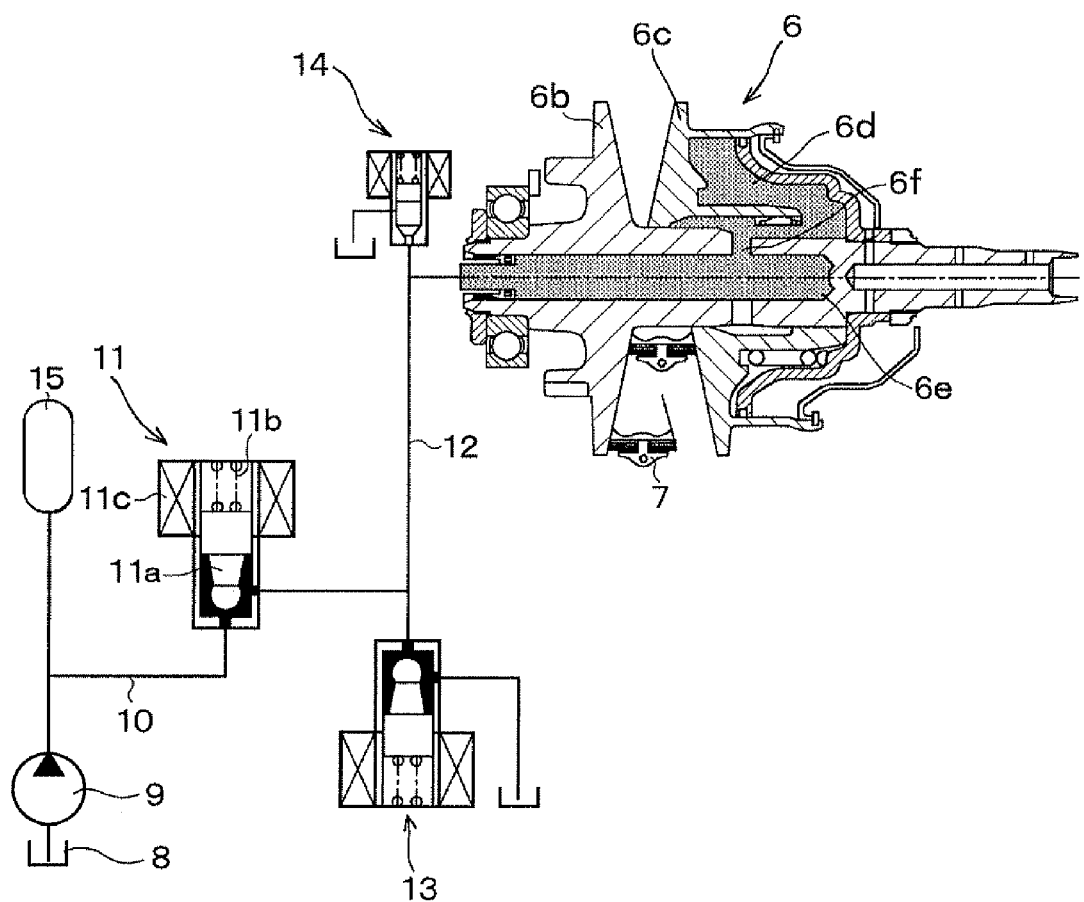
FIG. 3 is a view showing an example of a hydraulic circuit for delivering and draining the oil to/from the automatic transmission.

FIG. 3 is a view showing an example of a hydraulic circuit for delivering and draining the oil to/from the hydraulic chambers 3d and 6d. Structures of the primary pulley 3 and the secondary pulley 6 are substantially identical to each other, therefore, only the secondary pulley 6 is shown in FIG. 3 as an example to be explained. As shown in FIG. 3, an oil pump 9 is arranged in the hydraulic circuit to increase a pressure of the oil drawn from an oil pan 8. The oil pump should not be limited to a specific type, that is, not only a mechanical pump driven by the power of the prime mover but also an electric pump driven by a motor may be used as the oil pump 9.

An oil passage 10 is connected with the oil pump 9, and a delivery control valve 11 is arranged on the oil passage 10. Specifically, the delivery control valve 11 is adapted to permit the oil to be delivered from the oil pump 9 to the hydraulic chamber 6d when opened. In order to reduce fluctuation of the pressure in the hydraulic chamber 6d, it is preferable to use an anti-leakage valve as the delivery control valve 11. For example, a poppet valve closed by pushing a valve element onto a port is especially preferable. Therefore, the poppet valve is used as the delivery control valve 11 in the example shown in FIG. 3. Specifically, as shown in FIG. 3, the delivery control valve 11 comprises: a valve element 11a; an elastic member 11b that pushes the valve element 11b elastically toward an input port; and a solenoid 11c that applies an electromagnetic force to the valve element 11b in the direction against the elastic force established by the elastic member 11b. The port of the delivery control valve 11 thus structured is opened and closed by controlling an electric power applied thereto according to a target hydraulic pressure to be achieved in the hydraulic chamber 6d.

The delivery control valve 11 is connected with the secondary pulley 6 through an oil passage 12. In the secondary pulley 6, a flow path 6e is formed along a rotational center axis, and an opening 6f is formed in the flow path 6e to connect the flow path 6e with the hydraulic chamber 6d.

A drain control valve 13 is arranged on the oil passage 12 connecting the delivery control valve 11 with the secondary pulley 6, and an air bleed valve 14 is also arranged on an upper region of the oil passage 12. A structure of the drain control valve 13, and a structure of the air bleed valve 14 are similar to that of the delivery control valve 11.

Additionally, an accumulator 15 is arranged on the oil passage 10 between the oil pump 9 and the delivery control valve 11. The accumulator 15 is adapted to accumulate excess pressure resulting from boosting the hydraulic pressure by the oil pump 9. When a discharging amount of the oil pump 9 is insufficient, e.g., during a driving transient state of the oil pump 9, the accumulator 15 will assist the hydraulic pressure.

Next, an action of the above-explained example will be explained hereinafter. As described, the hydraulic chamber 6d is formed on the movable sheave 6c of the secondary pulley 6 so that the hydraulic chamber 6d is rotated together with the movable sheave 6c by the torque from the prime mover 2. In this situation, therefore, a centrifugal force will act on the oil in the hydraulic chamber 6d and compressible gas (as will be simply called "air" hereinafter) entrained in the oil. Essentially, specific gravity of air is smaller than that of the oil. Therefore, in the rotating hydraulic chamber 6d, the oil will centrifugally migrate to an outer circumferential side and the entrained air will centrifugally migrate to an inner circumferential side. As a result, the entrained air can be centrifugally separated from the oil by rotating the secondary pulley 6. As described, the opening 6f connects the hydraulic chamber 6d and the flow path 6e, and the opening 6f and the flow path 6e are situated in the inner circumferential side of the hydraulic chamber 6d. In this situation, therefore, the entrained air thus migrating toward the inner circumferential side of the hydraulic chamber 6d will eventually enter the flow path 6e.

The entrained air thus enters the flow path 6e can be forced out of the flow path 6e together with the oil flowing therethrough by compressing a volume of the hydraulic chamber 6d, or by draining the oil from the flow path 6e. Then, the entrained air thus forced out of the flow path 6e enters the oil passage 12. In the oil passage 12, the entrained air having specific gravity lighter than that of the oil floats toward the air bleed valve 14 arranged on an upper region of the oil passage 12. Therefore, the entrained air in the oil passage 12 can be discharged from the air bleed valve 14 together with the oil by opening the air bleed valve 14.

If the entrained air is evacuated from the hydraulic chamber 6d while the vehicle is running, specifically, while the wheels 5 are being rotated by the driving force transmitted through the continuously variable transmission 1, a driving comfort of the vehicle may be deteriorated. For example, in case of evacuating the entrained air from the hydraulic chamber 6d while the vehicle is running by compressing the volume of the hydraulic chamber 6d, a speed ratio of the continuously variable transmission 1 will be varied. In this case, therefore, a shift shock may be caused. Alternatively, in case of evacuating the entrained air from the hydraulic chamber 6d while the vehicle is running by draining the oil from the hydraulic chamber 6d, a clamping force to clamp the belt 7 will be reduced. In this case, therefore, a slippage of the belt 7 may be caused.

In order to avoid the above-explained disadvantages, the hydraulic control system of the present invention is configured to evacuate the entrained air from the hydraulic camber 6d while the vehicle is stopping, or under the condition that the wheels 5 are not rotated by the driving force transmitted thereto through the continuously variable transmission 1. In the conventional power train, a torque reversing mechanism is arranged between the prime mover and the continuously variable transmission. In the conventional power train thus structured, the continuously variable transmission connected with the wheels cannot be rotated to separate the entrained air and the oil when the vehicle is stopping. In order to avoid such a disadvantage, in a power train of the present invention, a torque reversing mechanism 16 is arranged between an output side of the continuously variable transmission 1 and a gear train 4.

Here will be briefly explained a structure of the torque reversing mechanism 16. In this example, an internal combustion engine which is allowed to be rotated only in one direction is used as the prime mover 2. Therefore, a conventional double-pinion type planetary gear mechanism is arranged as the torque reversing mechanism 16 in the power train of the present invention. Specifically, the torque reversing mechanism 16 comprises: an input shaft 16a; a sun gear 16b integrated with the input shaft 16a; a ring gear 16c as an internal gear arranged concentrically with the sun gear 16b; a first pinion gear 16d meshing with the sun gear 16b in a manner to revolve around the input shaft 16a while rotating; a second pinion gear 16e meshing with the first pinion gear 16d and the ring gear 16c in a manner to revolve around the input shaft 16a while rotating; and a carrier 16f holding the first and second pinion gears 16d and 16e. In order to rotate the carrier 16f in the same direction as the input shaft 16a, the torque reversing mechanism 16 is provided with a clutch C1. In addition, in order to rotate the carrier 16f in a direction opposite from the rotational direction of the input shaft 16a, the torque reversing mechanism 16 is provided with a brake B1 for halting the ring gear 16c. The clutch C1 and the brake B1 are adapted to be actuated hydraulically. For example, in case D range is selected by the driver, the clutch C1 is engaged. Alternatively, in case R range is selected, the brake B1 is engaged. In case N range is selected, both of the clutch C1 and the brake B1 are disengaged.

The torque reversing mechanism 16 thus structured is arranged between the continuously variable transmission 1 and the wheels 5. Therefore, according to this example, the secondary pulley 6 is allowed to be rotated even if the vehicle is stopped. Specifically, the continuously variable transmission 1 can be disconnected from the wheels 5 to establish the neutral stage by disengaging the clutch C1 and the brake B1. That is, the secondary pulley 6 can be rotated even when the vehicle is stopping by thus disengaging the clutch C1 and the brake B1.

Figure 1:
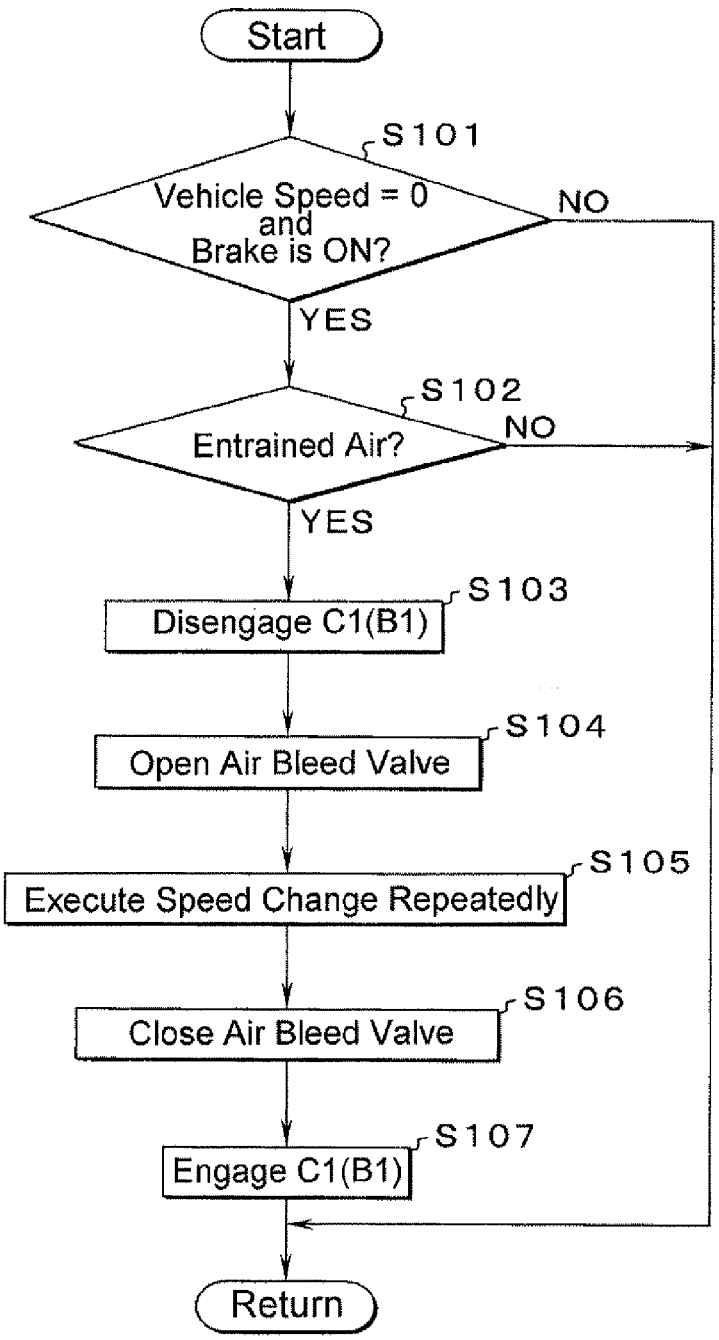
FIG. 1 is a flowchart showing a first control example of the hydraulic control system for the automatic transmission according to the present invention.

Control example of the hydraulic control system thus structured will be explained hereinafter. FIG. 1 is a flowchart showing a first control example. The first control example is configured to remove the entrained air from the oil in the hydraulic chamber 6d while the vehicle is stopping. For this purpose, first of all, it is determined whether the vehicle is stopped while activating a brake (at step S101). Here, the brake includes both of a parking lock and a foot brake. A reason to determine activation of the brake is that the vehicle may be moved if the vehicle is brought to the neutral stage by disengaging the clutch C1 and the brake B1 without applying the brake. In case the answer of step S101 is NO, the routine is returned without carrying out any specific control. To the contrary, in case the answer of step S101 is YES, then it is determined whether the air is entrained in the oil held in the hydraulic chamber 6d (at step S102).

Figure 4:
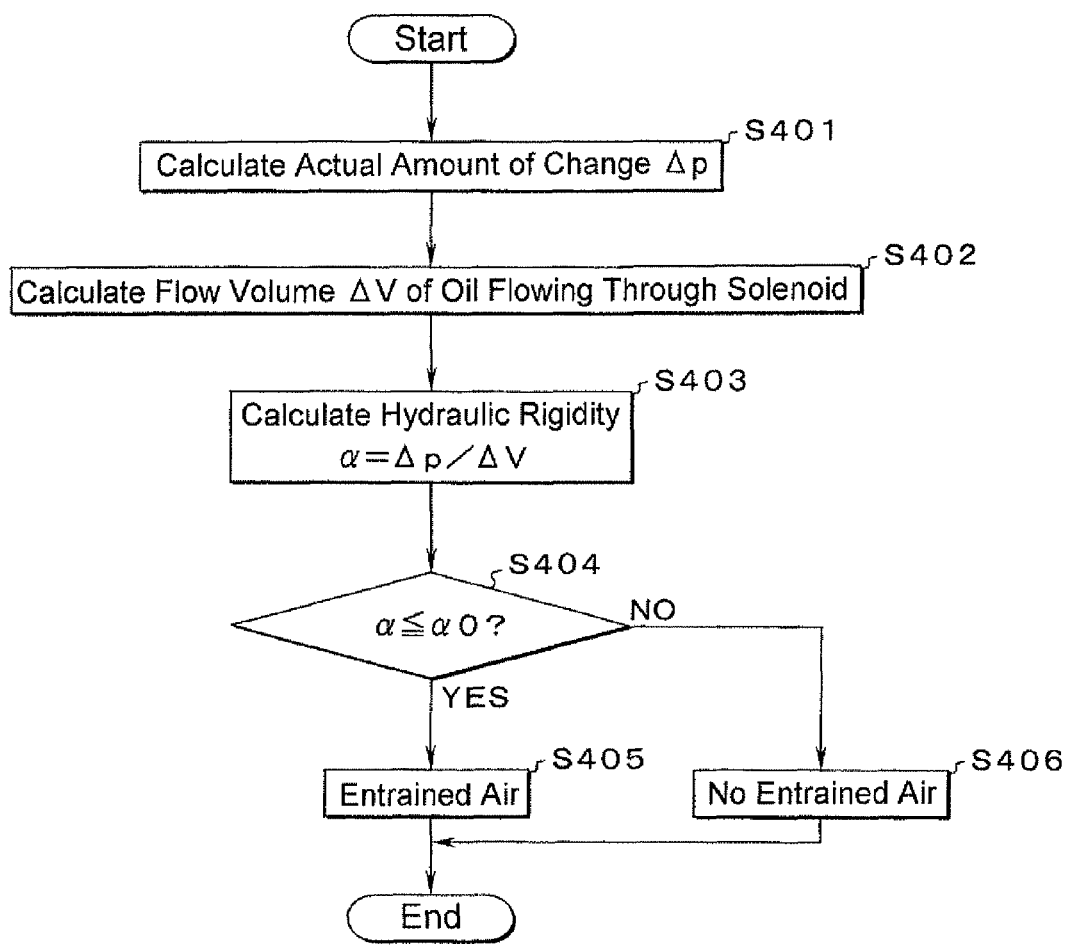
FIG. 4 is a flowchart showing a control example for judging an entrainment of air in the oil.

Specifically, air entrainment in the oil can be determined by carrying out a control to be explained in the following. FIG. 4 is a flowchart showing details of the determination carried out at step S102. First of all, an actual amount of change ΔP of hydraulic pressure in the hydraulic chamber 6d is calculated (at step S401). For this purpose, the hydraulic pressure is detected repeatedly at extremely short intervals. Therefore, the amount of change ΔP of hydraulic pressure can be obtained by calculating a difference between a currently detected pressure Pout (n) and a previously detected pressure Pout (n−1). Then, a flow volume ΔV of the oil flowing through the control valve 11 (or 13) is calculated (at step S402). Specifically, at step S402, a flow volume ΔV of the oil flowing through the delivery control valve 11 or the drain control valve 13 opened to change the hydraulic pressure is calculated using the following formula:

$$\Delta V = \int CA \sqrt{\frac{2(P_{in} - P_{out})}{\rho}} \, dt \qquad \text{[Formula 1]}$$

where "C" represents a flow volume coefficient, "A" represents an opening area of the control valve, and "ρ" represents a density of the oil.

Then, hydraulic rigidity of the oil is calculated based on the amount of change of hydraulic pressure calculated at step S401 and the flow volume of the oil calculated at step S402 (at step S403). Specifically, the hydraulic rigidity can be obtained by dividing the amount of change of hydraulic pressure by the flow volume of the operating oil. Thereafter, it is determined whether the hydraulic rigidity calculated at step S403 is equal to or smaller than a threshold α0 (at step S404). The threshold α0 is set in advance through experiment while allowing for measurement error of a detecting device and so on.

In case the answer of step S404 is YES, the hydraulic control system determines that the air is entrained in the oil in the hydraulic chamber 6d (at step S405), and the routine is returned. To the contrary, in case the answer of step S404 is NO, the hydraulic control system determines that the air is not entrained in the oil in the hydraulic chamber 6d (at step S406), and the routine is returned.

The entrained air in the oil may also be determined by other methods instead of the above-explained control. If, for example, the vehicle has been stopped so that the oil pump 9 remains stopped for a certain period of time, it is presumed that at least a small amount of the oil leaks from the hydraulic chamber 6d and air is thereby entrained in the oil in the hydraulic chamber 6d. Therefore, the determination of an entrainment of air in the oil may also be made based on a duration of a stop event of the oil pump 9. In addition, a drop in oil temperature or atmospheric pressure will result in air bubbles in the oil. Therefore, the entrained air in the oil may also be determined based on a detection value of a temperature detecting device for detecting an oil temperature or a detection device for detecting an altitude of the running vehicle.

In case air is not entrained in the oil in the hydraulic chamber 6d so that the answer of the aforementioned step S102 is NO, the routine is returned without carrying out any specific control. To the contrary, in case air is entrained in the oil in the hydraulic chamber 6d so that the answer of step S102 is YES, the air is removed from the oil. For this purpose, the clutch C1 or the brake B1 of the torque reversing mechanism 16 is disengaged (at step S103). Specifically, in case D range is selected by the driver, the clutch C1 is in engagement. In this case, therefore, the clutch C1 is disengaged to establish the neutral stage. In contrast, in case the R range is selected by the driver, the brake B1 is in engagement. In this case, therefore, the brake B1 is disengaged to establish the neutral stage. Then, the air bleed valve 14 is opened (at step S104), and a speed change operation of the continuously variable transmission 1 is carried out repeatedly while transmitting the power of the prime mover 2 to the continuously variable transmission 1 (at step S105). As a result, the entrained air is centrifugally separated from the oil while migrating toward the rotation center of the hydraulic chamber 6d rotated by the power of the prime mover 2. In this situation, the volume of the hydraulic chamber 6d is compressed by thus carrying out a speed change operation and the air or air/oil mixture is pushed out of the hydraulic chamber 6d toward the air bleed valve 14. For this purpose, a number of times to repeat the speed change operation, and a rate of change of the speed ratio are determined depending on the hydraulic rigidity of the oil. For example, if the hydraulic rigidity of the oil is low, the rate of change of the speed ratio and the number of times to repeat the speed change operation are increased.

After carrying out the speed change operation predetermined times, the air bleed valve 14 is closed (at step S106). Then, the clutch C1 or the brake B1 disengaged at step S103 is engaged (at step S107), and the routine is returned. If the prime mover 2 is idling when engaging the clutch C1 or the brake B1, the power of the prime mover 2 is absorbed by the torque converter 18 interposed between the prime mover 2 and the continuously variable transmission 1. In this situation, therefore, the vehicle is stopped by applying the parking lock or the foot brake.

Thus, according to the present invention, the continuously variable transmission 1 is allowed to be rotated by controlling the clutch C1 or the brake B1 even if the vehicle is stopped. Therefore, the entrained air in the oil held in the hydraulic chamber 6d can be centrifugally separated from the oil by rotating the continuously variable transmission 1, and the entrained air separated from the oil is discharged through the air bleed valve 14. For this reason, the hydraulic rigidity of the oil can be enhanced so that response and accuracy of the hydraulic system can be improved.

Figure 5:
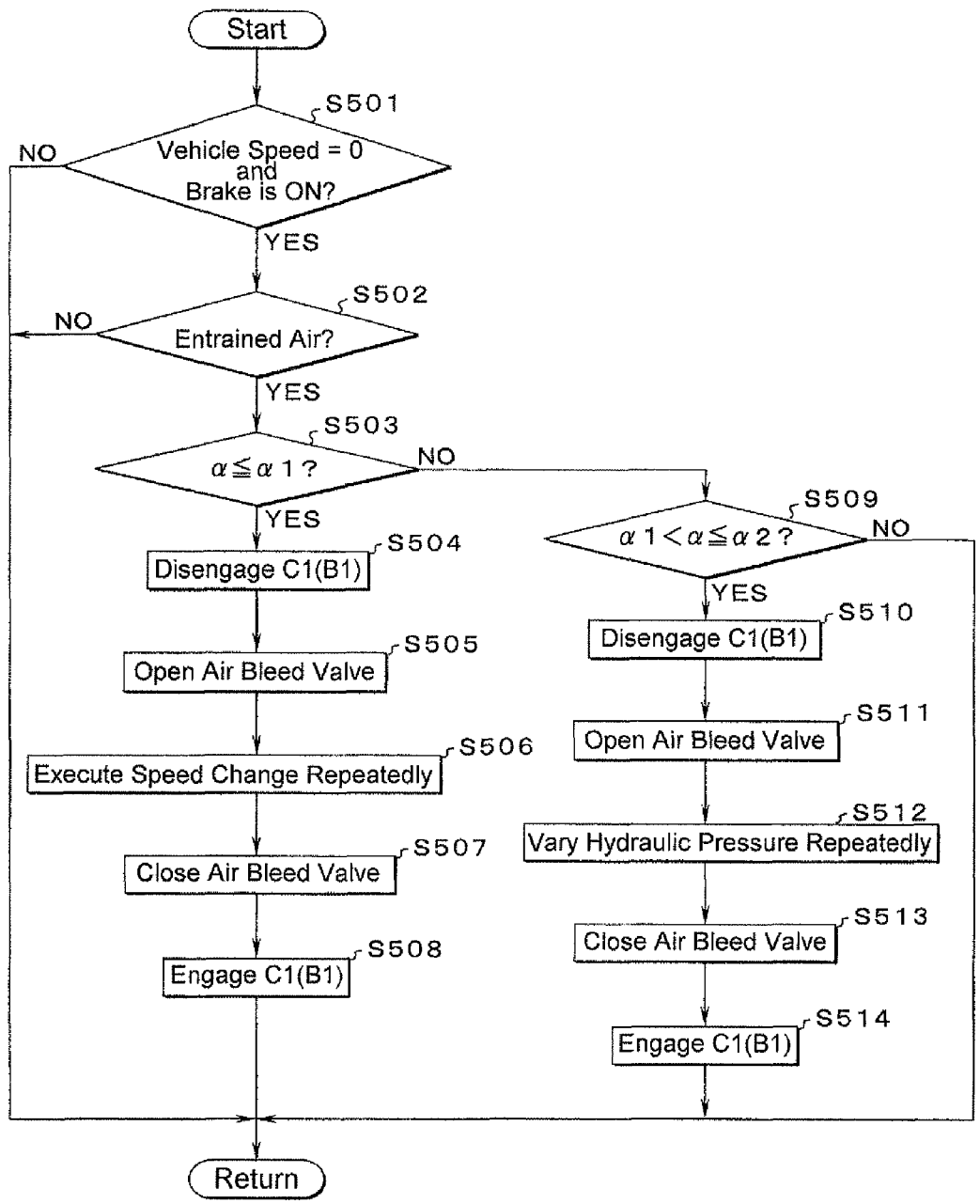
FIG. 5 is a flowchart showing a second control example.

Next, the second control example of the present invention will be explained hereinafter. FIG. 5 is a flowchart showing the second control example. The second control example is a modified example of the first control example to alter the air discharging method depending on an amount of the entrained air in the oil. According to the second control example shown in FIG. 5, the determination identical to step S101 is carried out at step S501, and the determination identical to that of step S102 is carried out at step S502. In case the answer of step S502 is YES, then it is determined whether the hydraulic rigidity calculated to determine an entrainment of air in the oil is equal to or larger than a second threshold α1 (at step S503). The second threshold α1 is a criterion set in advance through experiment, which is used to determine whether the current hydraulic rigidity degrades the hydraulic response and the control accuracy. That is, if the calculated hydraulic rigidity is equal to or smaller than the second threshold α1, this means that the rigidity of the oil has to be increased immediately. Therefore, in case the answer of step S503 is YES, the controls identical to those of the above-explained steps S103 to S107 are carried out sequentially (at steps S504 to S508). To the contrary, in case the answer of step S503 is NO, it is determined whether the calculated hydraulic rigidity is larger than the second threshold α1 but equal to or smaller than the third threshold α2 (at step S509). The third threshold α2 is a criterion set in advance through experiment, which is larger than the second threshold α1 but smaller than the threshold α0 used to determine the entrainment of air in the oil.

In case the calculated hydraulic rigidity is sufficiently high so that it is unnecessary to remove the entrained air from the oil, that is, in case the answer of step S509 is NO, the routine is returned. To the contrary, in case the calculated hydraulic rigidity is not so low but the air still is entrained in the oil, that is, in case the answer of step S509 is YES, the entrained air is removed from the oil in the hydraulic chamber 6d (at step S510 to S514).

Specifically, the clutch C1 or the brake B1 is disengaged (at step S510), and the air bleed valve 14 is opened (at step S511). Thus, the control identical to those of steps S103 and S504 is carried out at step S510, and the control identical to those of steps S104 and S505 is carried out at step S511. Then, hydraulic pressure in the hydraulic chamber 6d is varied repeatedly (at step S512). As a result, the entrained air is discharged from the hydraulic chamber 6d together with the oil. Specifically, the hydraulic pressure in the hydraulic chamber 6d is varied by draining the oil from the hydraulic chamber 6d and refilling the hydraulic chamber 6d with the oil. A drain rate and a refill rate, as well as number of times to repeat the control of step S512 with respect to the rigidity of the oil are determined based on an experimental result.

After removing the entrained air from the oil in the hydraulic chamber 6d, the air bleed valve 14 is closed (at step S513), and the clutch C1 or the brake B1 is engaged (at step S514). Then, the routine is returned.

Thus, in case an amount of the entrained air in the oil is large and therefore required to remove the entrained air immediately from the oil, a large amount of the entrained air can be discharged by carrying out a speed change operation to compress the volume of the hydraulic chamber 6d. Alternatively, in case an amount of the entrained air in the oil is not so large but still necessary to remove the entrained air from the oil, the entrained air may also be discharged by merely draining the oil from the hydraulic chamber 6d and refilling the hydraulic chamber 6d with the oil. In this case, an amount of the oil discharged together with the entrained air can be reduced in comparison with that of the case of discharging the entrained air by carrying out a speed change operation. Therefore, an operating frequency of the oil pump 9 can be reduced, and in addition, the oil pump 9 can be downsized. For these reasons, a fuel economy of the vehicle can be improved.

Figure 6:
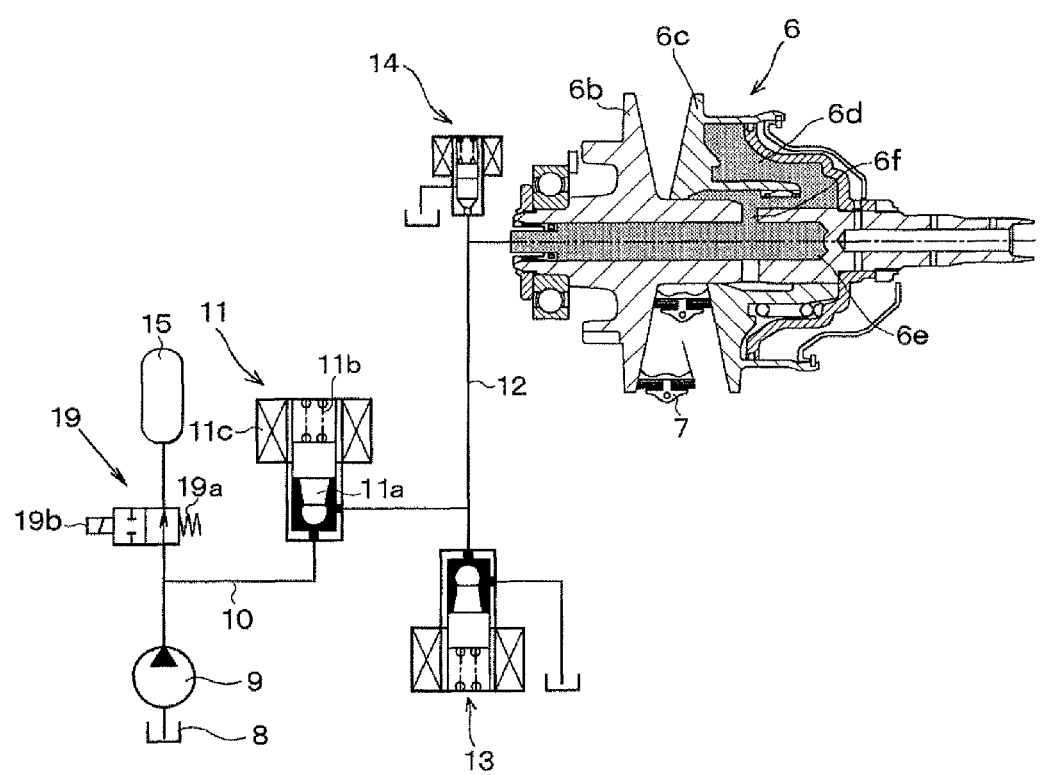
FIG. 6 is a view showing another example of the hydraulic circuit in which a control valve is arranged on an oil passage connected with an accumulator.

In the first and second control example, the entrained air is thus removed from the oil by varying a speed ratio or by varying the hydraulic pressure in the hydraulic chamber 6d. For this purpose, it is necessary to deliver the oil to the hydraulic chamber 6d by opening at least the delivery control valve 11. However, as a precaution to assist to achieve a required hydraulic pressure using the oil accumulated in the accumulator 15 when the vehicle is running, it is preferable to save the oil accumulated in the accumulator 15 by inhibiting to deliver the oil in the accumulator 15 to the hydraulic chamber 6d to remove the entrained air from the oil when the vehicle is stopping. For this purpose, as shown in FIG. 6, the hydraulic circuit may be modified by arranging a switching valve 19. In this example, the accumulator 15 can be disconnected from the oil passage 10 when discharging the entrained air from the hydraulic chamber 6d by closing the switching valve 19. A structure of the switching valve 19 will be briefly explained hereinafter. As shown in FIG. 6, the switching valve 19 comprises an elastic member 19a, and a solenoid 19b adapted to apply an electromagnetic force against an elastic force of the elastic member 19a. The switching valve 19 thus structured disconnects the accumulator 15 from the oil passage 10 in case the elastic force of the elastic member 19a exceeds the electromagnetic force of the solenoid 19b, and connects the accumulator 15 with the oil passage 10 in case the electromagnetic force of the solenoid 19b exceeds the elastic force of the elastic member 19a.

Figure 7:
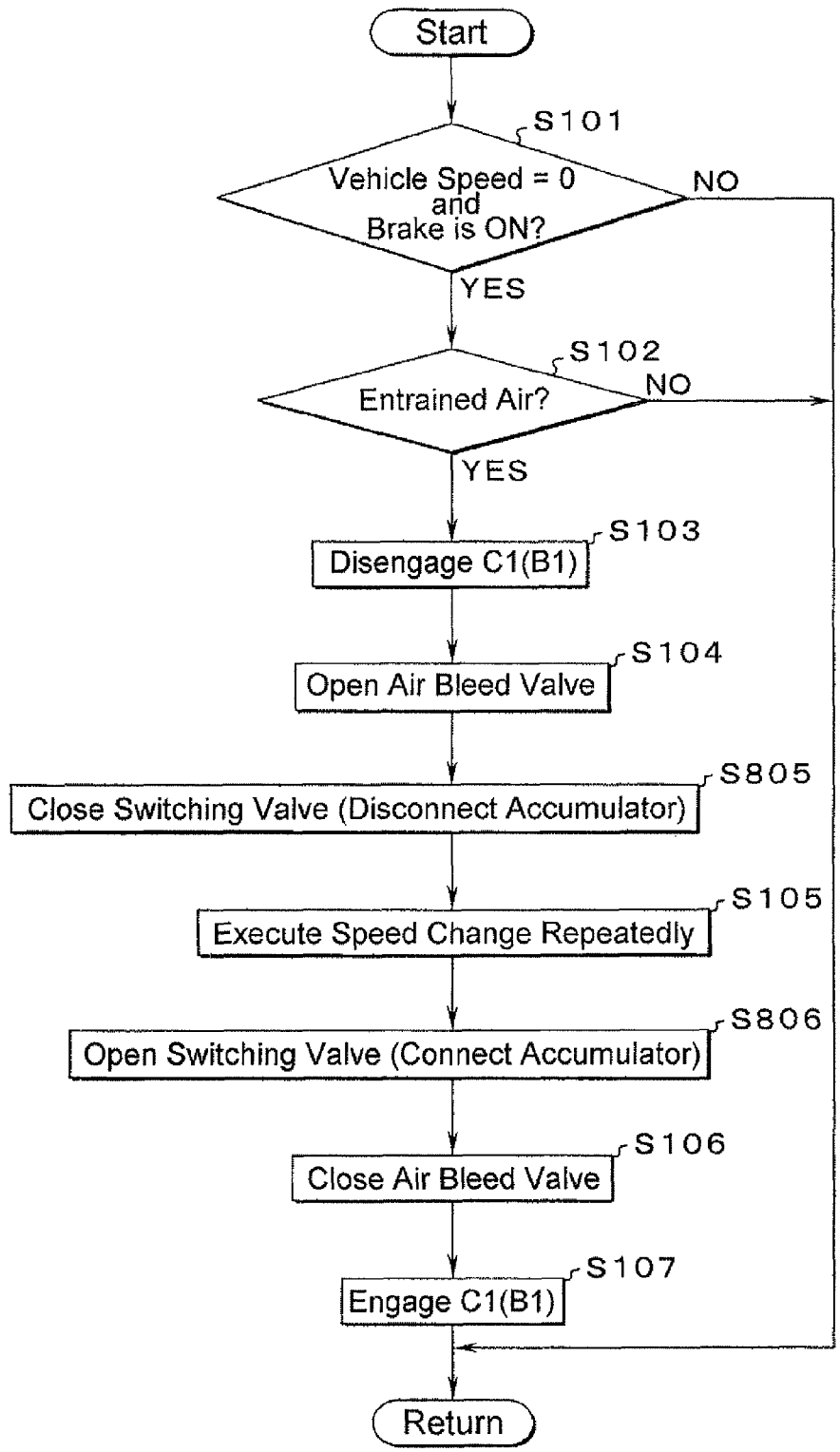
FIG. 7 is a flowchart showing an example of controlling the hydraulic circuit shown in FIG. 6.

Here will be explained an example for controlling the hydraulic circuit thus having a function to connect the accumulator 15 with the oil passage 10 selectively, with reference to a flowchart shown in FIG. 7. The example shown in FIG. 7 is a modification of the first control example, therefore, contents of the example shown in FIG. 7 are basically identical to those of the first control example. However, according to the example shown in FIG. 7, the switching valve 19 is closed before carrying out a speed change operation, and opened after the speed change operation.

Specifically, as the first control example, the aforementioned steps S101 to S104 are carried out sequentially. Then, the switching valve 19 is closed to disconnect the accumulator 15 from the oil passage 10 (at step S805), and a speed change operation is carried out repeatedly to discharge the entrained air (at step S105). Thereafter, the switching valve 19 is opened to connect the accumulator 15 with the oil passage 10 (at step S806). The remaining steps are identical to those of the first control example.

Thus, according to the example shown in FIG. 7, the switching valve 19 is closed to disconnect the accumulator 15 from the oil passage 10 before carrying out a speed change operation, and opened to connect the accumulator 15 with the oil passage 10 after the termination of the speed change operation. Therefore, the hydraulic pressure accumulated in the accumulator 15 will not be consumed when removing the entrained air from the oil or when the vehicle is stopped.

Figure 8:
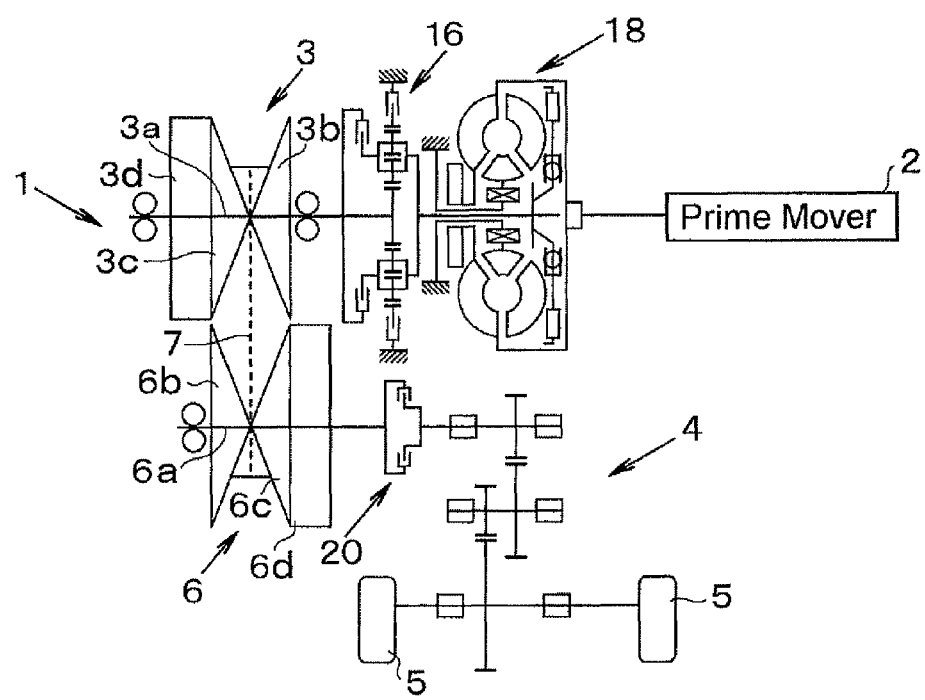
FIG. 8 is a skeleton diagram showing another example of power train having the automatic transmission to which the present invention is applied.

As has been explained, the hydraulic control system of the present invention is configured to separate the entrained air centrifugally from the oil by rotating the hydraulic chamber 6d of the continuously variable transmission 1, and to discharge the entrained air thus separated from the oil. For this purpose, the continuously variable transmission 1 has to be disconnected from the wheels 5 to cut off power transmission therebetween. Therefore, according to the examples thus far explained, the torque reversing mechanism 16 is interposed between the continuously variable transmission 1 and the wheels 5. Alternatively, as shown in FIG. 8, the continuously variable transmission 1 may also be disconnected from the wheels 5 by arranging another clutch 20 therebetween while arranging the torque reversing mechanism 16 between the prime mover 2 and the continuously variable transmission 1. In this case, the clutch 20 is disengaged at steps S103 and engaged at step S107.

Figure 9:
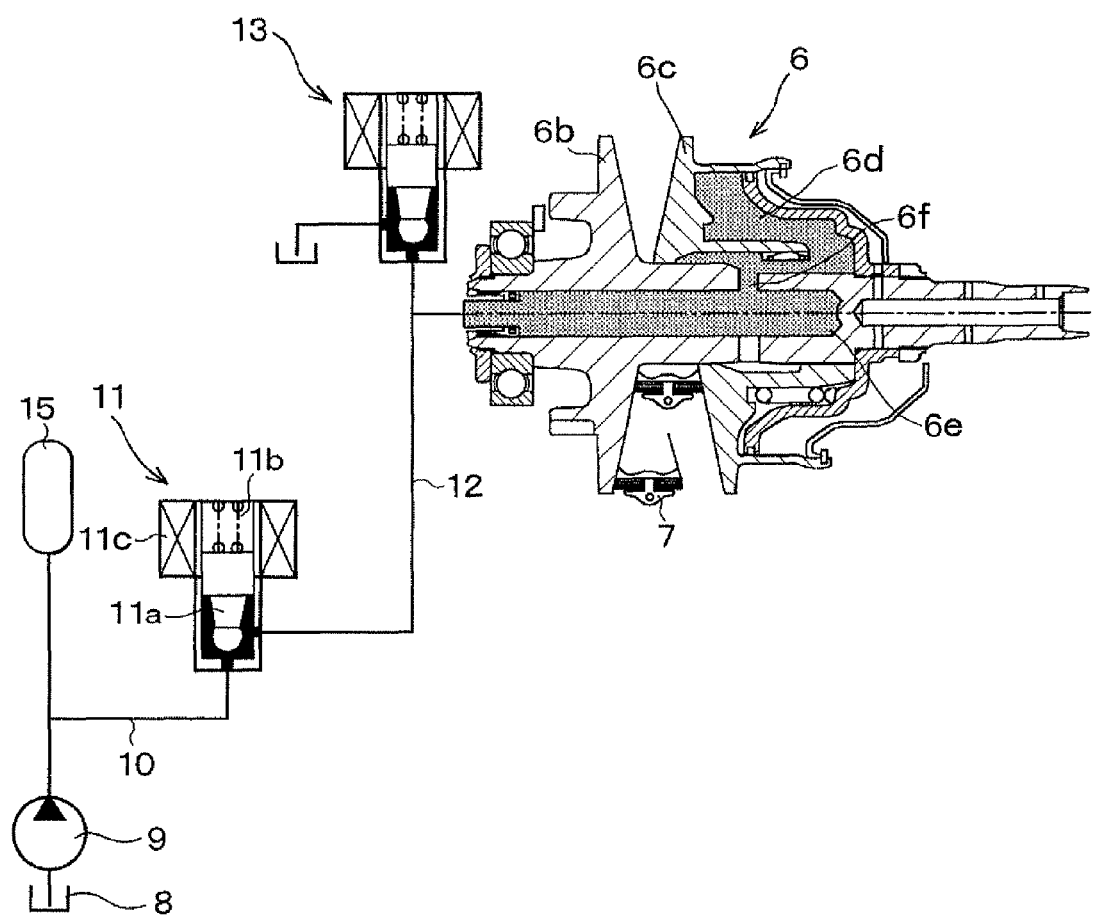
FIG. 9 is a view showing still another example of a hydraulic circuit for delivering and draining the oil to/from the automatic transmission.

In addition, the hydraulic system may be modified to use the conventional drain control valve 13 instead of the air bleed valve 14. In this case, as shown in FIG. 9, the drain control valve 13 is arranged at the position of the air bleed valve 14, and the drain control valve 13 thus arranged is also opened to discharge the entrained air.

Although the hydraulic control of the present invention is carried out to control the secondary pulley 6 in the foregoing examples, the hydraulic control of the present invention may also be carried out to control the primary pulley 3. According to the present invention, the automatic transmission should not be limited to the belt-type continuously variable transmission 1. For example, a conventional toroidal continuously variable transmission and a geared transmission may also be employed as the automatic transmission. In addition, the hydraulic control system of the present invention may also be applied to aircrafts, vessels, and other kinds of industrial machineries to enhance hydraulic rigidity by disconnecting power transmission between an output shaft and a member to which the torque is transmitted. Further, in the foregoing example, electrically actuated poppet valves are used as the control valves 11 and 13, and the air bleed valve 14. However, other kinds of valves, e.g., a valve adapted to open and close a port hydraulically, a valve adapted to open and close a port by a cam mechanism and etc. may also be used as the control valves.

The invention claimed is:

1. A hydraulic control system for an automatic transmission that is adapted to vary a torque inputted thereto according to a speed ratio and output the varied torque from an output member to a driving wheel, and to vary a transmission torque capacity by delivering or draining hydraulic fluid to/from an actuator of a transmission member, the hydraulic control system comprising:
 a discharging device configured to discharge compressible gas entrained in the hydraulic fluid in the actuator;
 another member interposed between the output member and the driving wheel, the another member being rotated by a torque transmitted from the output member;
 an interrupting device configured to disconnect the output member from said the another member; and
 a controller configured to:
 (1) determine whether an entrainment of the compressible gas in the hydraulic fluid has occurred;
 (2) disconnect the output member from the another member via the interrupting device in a case that the controller determines that the compressible gas is entrained in the hydraulic fluid; and
 (3) cause the entrained compressible gas to be removed from the hydraulic fluid and discharged through the discharging device by causing the actuator to rotate with the transmission member under the condition that the output member has disconnected from the another member.

2. The hydraulic control system as claimed in claim 1, further comprising:
 an accumulator configured to accumulate the hydraulic fluid for delivery to the actuator, and wherein the controller is further configured to cause delivery of the hydraulic fluid from the accumulator to the actuator to be inhibited to compensate for the compressible gas removed from the hydraulic fluid.

3. The hydraulic control system as claimed in claim 1, wherein the controller is further configured to:
 calculate a rigidity of the hydraulic fluid; and
 determine a necessity to remove the entrained compressible gas from the hydraulic fluid in a case that the rigidity of the hydraulic fluid is lowered.

4. The hydraulic control system as claimed in claim 3, wherein the controller is configured to calculate the rigidity of the hydraulic fluid based on:
 an amount of the hydraulic fluid delivered to the actuator or drained from the actuator; and
 an amount of change of hydraulic pressure in the actuator as a result of delivering the hydraulic fluid to the actuator or draining the hydraulic fluid from the actuator.

5. The hydraulic control system as claimed in claim 1, wherein the controller is further configured to determine a necessity to remove the entrained compressible gas from the hydraulic fluid based on that the compressible gas is entrained in the hydraulic fluid or that a possibility of entrainment of the compressible gas in the hydraulic fluid is high.

6. The hydraulic control system as claimed in claim 1, further comprising:
 a hydraulic pump adapted to establish a hydraulic pressure, and wherein the controller is further configured to determine a necessity to remove the entrained compressible gas from the hydraulic fluid based on a duration of a stop event of the hydraulic pump.

7. The hydraulic control system as claimed in claim 1, wherein the controller is further configured to cause a speed change operation of the automatic transmission under the condition that the output member is disconnected from the another member.

8. The hydraulic control system as claimed in claim 7, wherein the controller is configured to repeatedly cause the speed change operation of the automatic transmission.

9. The hydraulic control system as claimed in claim 1, wherein the controller is further configured to cause hydraulic pressure in the actuator to vary under the condition that the output member is disconnected from the another member.

10. The hydraulic control system as claimed in claim 9, wherein the controller is configured to cause the hydraulic pressure in the actuator to repeatedly vary.

11. The hydraulic control system as claimed in claim 1, further comprising:
 an oil passage for discharging at least the hydraulic fluid from the actuator, and wherein the discharging device is situated above the oil passage.

12. The hydraulic control system as claimed in claim 1, wherein the automatic transmission includes a belt-driven continuously variable transmission comprising:
 a primary pulley to which torque is inputted;
 a secondary pulley which outputs the torque transmitted from the primary pulley; and
 a belt applied to the primary pulley and the secondary pulley to transmit the torque therebetween.

13. The hydraulic control system as claimed in claim 12, wherein the actuator includes a hydraulic actuator attached to at least one of the primary pulley and the secondary pulley.

14. The hydraulic control system as claimed in claim 1, wherein the interrupting device includes:
 a clutch adapted to be engaged to allow a torque reversing mechanism to output a torque in a same direction as that of a torque inputted thereto, and
 a brake adapted to be engaged to allow the torque reversing mechanism to output a torque in a rotational direction opposite to that of the torque inputted thereto; and
 wherein the controller is further configured to cause the output member to be disconnected from the another member by disengaging the clutch and the brake.

15. The hydraulic control system as claimed in claim 1, further comprising:
 a fluid transmission connected to an input side of the automatic transmission.

* * * * *